Oct. 22, 1935. L. K. LOFTIN Re. 19,737

CEDAR CHEST

Original Filed Aug. 22, 1929 2 Sheets-Sheet 1

Inventor
Lawrence K. Loftin

By Lewis S. Clarkson
Attorney

Oct. 22, 1935. L. K. LOFTIN Re. 19,737

CEDAR CHEST

Original Filed Aug. 22, 1929 2 Sheets-Sheet 2

Inventor
Laurence K. Loftin

By Louis S. Clarkson
Attorney

Reissued Oct. 22, 1935

Re. 19,737

UNITED STATES PATENT OFFICE 19,737

CEDAR CHEST

Lawrence K. Loftin, Altavista, Va., assignor to The Lane Company, Inc., a corporation of Virginia Original No. 1,890,999, dated December 13, 1932, Serial No. 387,688, August 22, 1929. Application for reissue December 4, 1934, Serial No. 755,991

20 Claims. (Cl. 206—10)

While I have, for the purpose of illustrating my invention, selected what is known to the trade as a cedar chest, it is, of course, obvious that my invention may with equal efficiency be embodied in wardrobes, chifforobes, closets and other receptacles designed for the destroying of the clothes moth larvae found in clothing, furs and similar articles stored in such receptacles.

From experiments, conducted over quite a long period, the object of which was to produce a cedar chest that would destroy the clothes moth larvae, it was discovered that aroma thrown off by the aromatic cedarwood oil, found in aromatic cedar was effective in killing moth larvae of any age if the proper concentration could be developed, and it was also found that the two fundamentals in securing proper concentration of aroma are to get enough cedarwood oil into the chest by introducing enough cedar lumber to supply this oil and by making the chest sufficiently aroma tight. By preventing this leakage and putting enough oil in the chest enough concentration can be obtained to kill moth larvae of any age, obviously obviating the necessity of having clothes cleaned to get them free of moth eggs and larvae, or beaten, or brushed, or sunned, all of which methods have been recommended by various authorities to free fabrics of moth infestation. The old type of cedar chest which was not aroma tight according to United States Government recommendations would kill newly hatched moth worms up to half grown (three months old), but if the fabrics had more than half grown moth worms on them, they were so hard to kill that the cedar aroma concentration in the chest was not strong enough to kill them, but this objection I have been able to overcome with my new aroma tight chest. The problem which I desired to work out was to destroy the moth larvae present in such articles, or hatching from eggs, that might have been deposited on them when they were stored away, as it has been difficult and expensive and, in fact, impractical, to so clean every article stored as to insure the non-existence of moth larvae or moth eggs when the article was stored away.

Experiments demonstrate the fact that the aroma of the cedar oil, which is in fact cedar oil in a highly gaseous or vapor state, suspended in the air, is extremely penetrating and that, if the article infested with moth larvae could be maintained in a receptacle for a sufficient length of time where the cedar aroma was of sufficient density, all moth larvae would be completely destroyed. The problem, therefore, was to first obtain a sufficient amount of cedar oil aroma, next to imprison this aroma in the receptacle so that the article would remain in an atmosphere of cedar aroma of sufficient density the required length of time to destroy the moths and, second, to so imprison and maintain the basic supply of cedar oil that the required density of aroma would be supplied over a long period of years to make the receptacle continuously effective.

It was also found by experiment that cedar aroma, that is cedar oil molecules in suspension in air, is approximately seven times as heavy as air. Consequently it is more dense at the bottom of the receptacle and, of course, when the receptacle is closed the giving off of the cedar oil molecules creates in the receptacle a vapor or gaseous pressure which, although slight as pressures are ordinarily measured, is quite sufficient to cause the cedar aroma to escape from the receptacle through any hole, crevice or crack. And, while it will escape more rapidly from a hole at the bottom of the chest, as the density is greater at the bottom, this pressure created as heretofore explained, will cause it at certain stages to escape regardless of the location of the leak. Leakage or escape of the aroma from the chest is also caused by the variation in temperature in the room outside as compared to the air within the chest. The approximate amount of cedar oil in the average red cedar board may be ascertained by dry weight and the chest constructed with the proper amount of red cedar for each cubic inch of storage space. This will give a sufficient quantity of cedar oil to produce aroma of sufficient density to be effective in destroying moths, provided the density of the aroma could be maintained, leakage prevented and the escape of the cedar oil in the form of aroma could be largely confined to the inside of the chest so that it might not be wasted by escape outside into the room.

This percentage of red cedar to the cubic content of a receptacle will not only supply an aroma of sufficient density to destroy moths, but will continue to supply it over a long period of years, provided as above, that leakage and waste are prevented.

My experiments conducted over many years have proven that the moth killing efficiency of a cedar chest is proportionate to the amount of cedar oil present in the closure and the aroma tightness of the closure.

Having as a result of this experiment determined the original amount of cedar oil required, I then proceeded to work out plans to prevent the loss of the cedar oil. I proceeded to cover the outside of the chest with a special finish proof against the leakage of oil of cedar on the outside face of the walls, bottom and top of the chest which not only imprisoned the cedar aroma within the chest, but also preserved the outside finish and prevented it from being dissolved by the cedar oil and from getting gummy and discolored from the presence of the cedar oil.

I covered the chest in many instances with a wood veneer, laid in different plies, with the grains crossed or laid parallel with this cedar, which not only furnished further insulation and prevented the escape of the cedar aroma, but preserved and protected the chest against warping or cracking so as to make effective the arrangements hereinafter described of making the cedar chest tight, against the escape of the aroma.

Probably with the special finish I use, a small percentage of the oil would flow through, but by laying a slice of veneer, and of course it takes a glue film to stick this veneer, the glue film and the foreign wood veneer do actually stop seventy-five to eighty percent of the oil that would come through the finish without veneer on a raw cedar panel and then by the time I put my special finish on top of this veneer it is my judgment that I have stopped about eighty-five to ninety-five percent of the original leakage from a raw panel through an ordinary finish directly applied. Thus the veneer forms an efficient stop for aroma.

I perfected a grooved bottom which is at the point of great density and, therefore, the greatest point of escape if a leak existed, which bottom was not only grooved, but was fabricated so as to prevent a leakage of the aroma in the cedar in the bottom, or from the inside of the chest, through the bottom.

I perfected a double, interlocked, sealed, mitered corner which would not pull apart, which was always tight and prevented leakage of any aroma from the corners. I arranged for a special flexible, sealing compound inserted in each joint so that even with rough treatment or contraction and expansion the joints would not only remain secure, but would remain completely aroma tight.

I used a spring lock (the subject matter of another application) which holds the top of the chest tight when closed, said lock-producing an audible click when closed, thereby notifying the user of the chest that the top was tight and the seal complete.

Around the inside of the top of the chest and around the hinges I attached a resilient metal strip, impervious to cedar oil, which, operating on the principle of a spring completely and absolutely seals the top of the chest when in closed position, said strip broadly being claimed in another application.

All of these various features and ideas are hereinafter more particularly described in detail. But the result of the combination of all of the above ideas was and is to produce a cedar chest or receptacle in which a sufficient density of cedar oil aroma is constantly maintained, and which is completely effective in destroying moth larvae, and which remains effective over a period of time which I estimate in ordinary usage to be not less than ten years.

Figure 1:
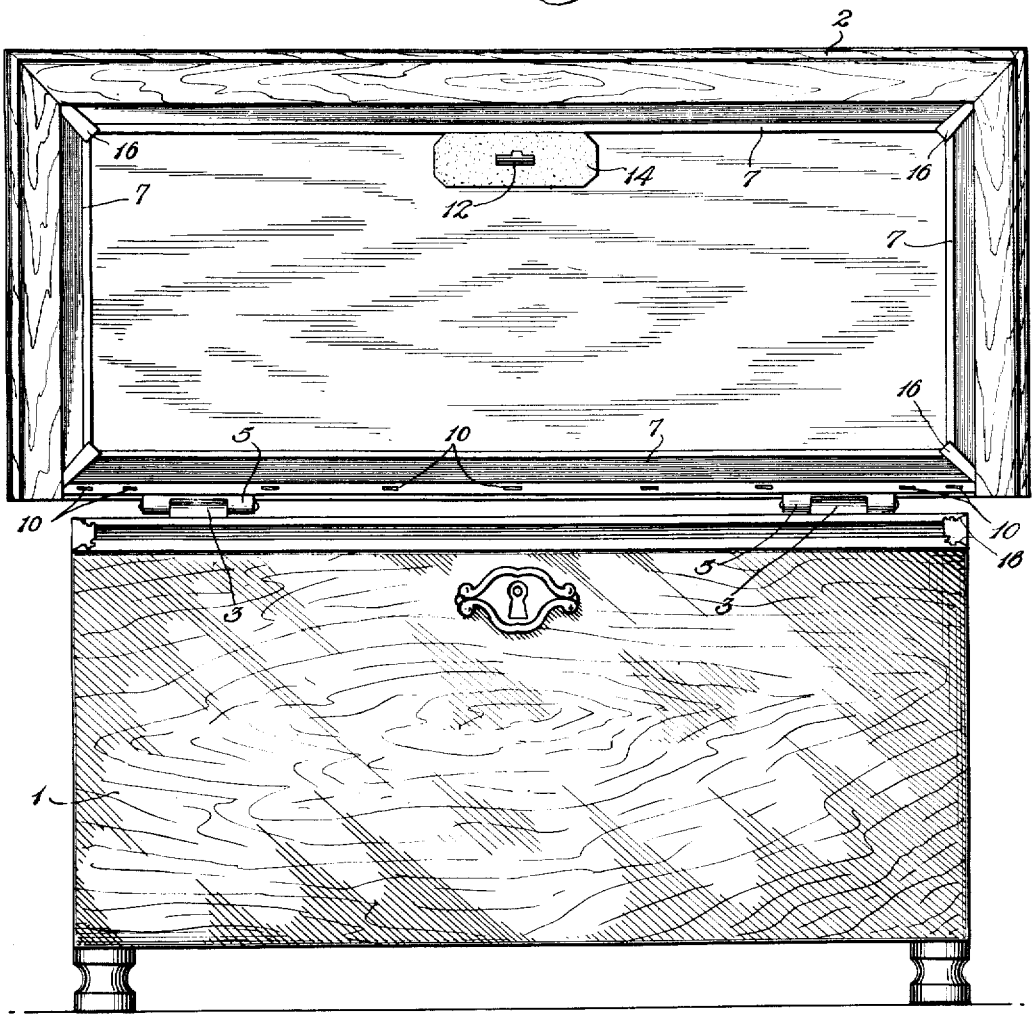
Figure 1 is a front elevation of my improved chest tilted slightly forward and with the top up.
Figure 8:
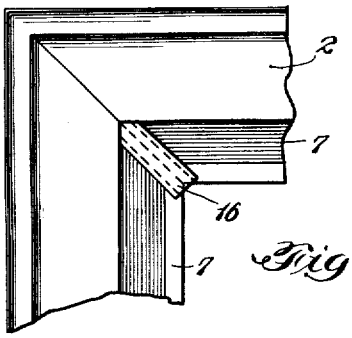
Figure 8 is an enlarged detail view of one corner of the top showing the lock between adjacent ends of the sealing strip.
Figure 7:
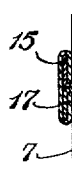
Figure 7 is an enlarged detail sectional view of the inter-locking joint between adjacent ends of the sealing strip.
Figure 2:
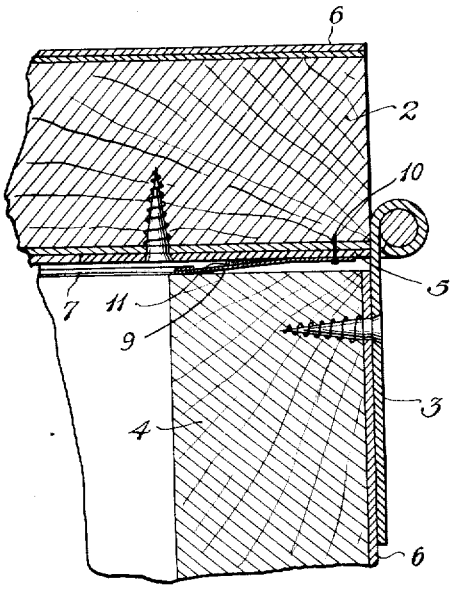
Figure 2 is a large detail sectional view through the chest at the hinge.

The reference numeral 1 designates the body of the chest having the top 2 hinged to the rear wall thereof. In this connection it will be noted that one leaf of the hinge (see Figure 2) designated by the numeral 3 is secured to the outer face of the rear wall 4 of the chest thereby eliminating the usual hinge notches in the upper edge of the back wall of the chest which I have found to be points for leakage of the aroma, while the leaf 5 of the hinge is countersunk in the underface of the top, preferably in a machined recess, whereby leakage of aroma between the hinge leaf 5 and the top is eliminated.

The vertical walls and the bottom of the chest are made of cedar wood of the necessary thickness to give off a predetermined amount of aroma of cedar oil, said walls, and bottom being provided with an outer veneer 6 of hard wood, or wood which is substantially proof against leakage of aroma of cedar oil therethrough, said veneer constituting in effect an insulation or efficient stop on the outer face of the chest to seal the oil and aroma within the wood for escape into the chest, said veneer being secured in place by a glue substantially proof against leakage of cedar oil. While the top may be made of any desired number of plies, I prefer to make it of five plies because with this number of plies it is much less likely to warp, which would cause leakage around the top edge of the chest.

Figure 3:
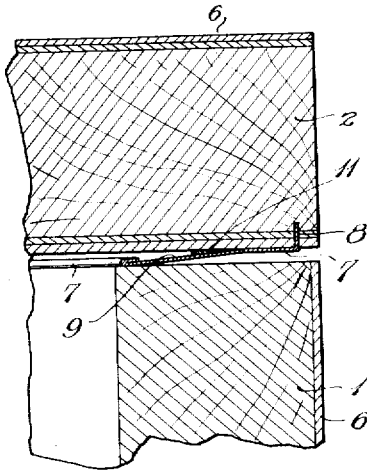
Figure 3 is an enlarged detail sectional view through the sealing joint between the top and body of the chest.

The top face or edge of the vertical walls of the chest body are fashioned to a perfect plane. 7 is a sealing strip of preferably bronze spring metal, broadly the subject matter of another application, one edge of which is bent at right angles as at 8, while the other edge portion is deflected as at 9 downwardly at an angle greater than at a right angle from the flange 8, the extreme edge of this portion 9 being rebent as clearly shown in the several figures of the drawings. In securing the sealing strip 7 to the top of the chest I form a groove (see Figure 3) which is filled with a resilient and plastic sealing compound substantially proof against cedar oil, in the inner face of the top into which the flange 8 is driven. The strip is further secured to the top by means of staples 10, or other suitable securing devices thereby rigidly securing the sealing strip to the top. Between the deflected portion 9 of the sealing strip and the under face of the top I have placed a plastic material 11 that is proof against leakage of oil of cedar thereby maintaining a sealed joint at this point.

Figure 6:
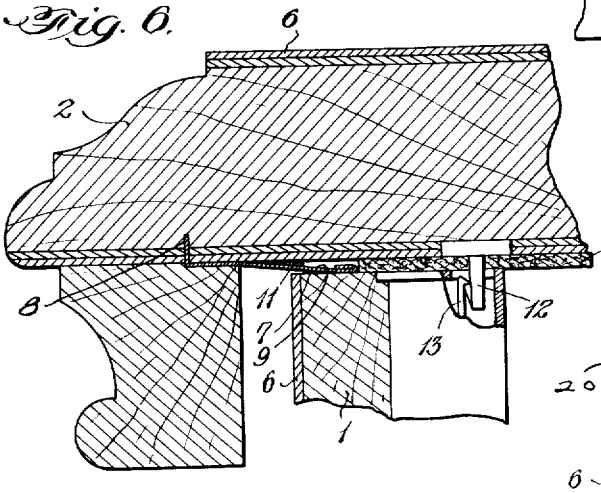
Figure 6 is an enlarged detail sectional view through the top and the chest at the lock.

The lock shown in Figure 6 is a subject matter of another application and therefore will not be described in detail. This lock comprises a hook 12 secured to the top of the chest which engages a latch 13. In order to prevent the escape of aroma through the lock I secure to the underface of the top a suitable material 14 substantially proof against leakage of aroma therethrough, said material functioning as a gasket.

The sealing strips at their ends are mitered, or cut on a bevel and provided with a return bend or backturned flange 15, the joint between the mitered ends being closed by a cap 16 extending under the bent ends 17 and interlocking the return bends at the end of the strips. Preferably this joint between the cap 16 and the ends of the strips 7 is substantially wedge shape thereby drawing the ends of the strips snugly together.

Figure 4:
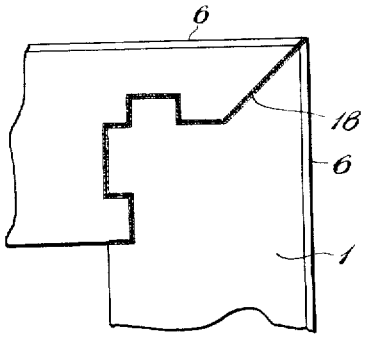
Figure 4 is an enlarged detail plan view showing the joint between the vertical walls of the chest.

As illustrated in Figure 4 the joint between the adjacent ends of the vertical walls of the chest is jogged so as to make it tortuous and irregular in shape and retards the leakage of aroma therethrough, and in order to completely seal this joint I have developed a plastic resilient sealing medium 18 which is packed in the joint, said sealing medium being proof against the leakage of oil of cedar and the aroma therethrough.

For many years solid cedar bottoms running straight grain with the chest were used, but it was found that these bottoms did not expand and contract with the same coefficient of contraction and expansion as the ends of the chest which was caused by the fact that the grain of the wood at the end was crosswise to the grain of the wood in the bottom of the chest, and this caused the bottoms to crack very badly. I have formed the bottom of my improved chest with plywood that is fabricated with a ¾ inch cedar core, and is veneered on the bottom with a foreign wood veneer 6, which veneer, as above stated, is substantially proof against oil leakage and is laid at right angles to the grain of the wood, or core of the bottom. In the joint (Figure 5) between the vertical walls and the bottom I apply a plastic material which is proof against leakage of cedar oil and aroma of cedar oil.

It will be noted from the several figures that the free edge of the sealing strip 7 is rebent so as to present a smooth contacting surface between it and the upper edges of the vertical walls of the chest thereby eliminating the possibility of metal cutting into the wood and destroying the tight sealing joint between the strip 7 and the upper edge of these walls.

Figure 5:
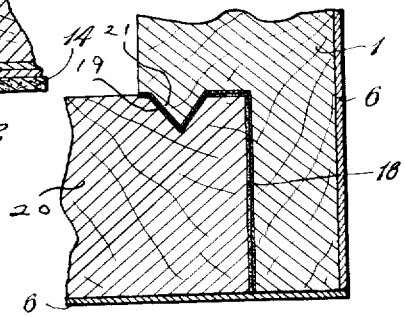
Figure 5 is an enlarged detail sectional view showing the joint between the bottom and vertical walls of the chest.

As more clearly shown in Figure 5, the joint at the bottom is tortuous, the jog or groove 19 in the upper face of the bottom member 20 being substantially V shaped into which the plastic resilient sealing medium 18 can be poured so that when the tongue 21 is inserted into the groove 19 the sealing medium 18 is slouched against the full area of the tongue 21 and groove 19 and packed in the joint, of course, as shown in Figure 5, this sealing medium 18 is throughout the joint. This groove 19 functions as a trough to hold the sealing medium prior to the assembly of the joint.

The metal sealing strip 7 is so offset at 9 that its free edge is permitted to have sufficient movement to compensate for as much as $\frac{3}{16}$ of an inch warpage of the lid of relative warpage to such extent between the lid and panels of the body. It is well known that solid wood panels are very likely to warp, and, even with the best treatment in manufacturing and in use, a 48 inch panel such as is commonly used in making cedar chest tops will sometimes warp or twist as much as one-half inch or more. Therefore, while our metal strip is made to compensate for a $\frac{3}{16}$ of an inch warpage, it is still impractical to form it so that it will compensate for a much greater warpage, and in order to eliminate liability of more than $\frac{3}{16}$ maximum warpage, and make the top 2 at least a 5-ply top and this 5-ply top, if properly manufactured, will not under any ordinary conditions of service warp or twist over $\frac{1}{16}$ of an inch, and the offset on the metal strip 7 will allow sufficient movement of the strip to compensate for this. Furthermore, of course the more plies used in the construction of the top, the more aroma-tight the top will be because every glue film and thickness of veneer offers about 75% resistance to the outflow of cedar aroma or oil to the exterior.

What I claim is:

1. A receptacle of the character described comprising a body member having comparatively broad flat upper edges, a closure hinged to said body, a resilient metal strip secured at one edge to the under face of said closure along its edges, and a pliable sealing mass not soluble in cedar oil between said strips and closure and at the juncture of the strips at the corners of the closure.

2. A container of the character described comprising a body and a top formed of material impregnated with oil of cedar, an outer veneer on the top and bottom, ends and sides, of said container of a material highly resistant against leakage of oil of cedar there-through, sealing means between the joints of the walls of the body highly sealing the same against the leakage of oil of cedar there-through, and a sealing element between the closure and body also substantially proof against leakage of oil of cedar.

3. A cedar chest comprising a body having walls including cedar oil bearing plies and outer sheathing plies adapted to seal the walls against the escape of cedar aroma, said walls being provided at their meeting edges with joints extending on tortuous lines and hermetically closed against the escape of cedar aroma therethrough by sealing means insoluble in cedar oil, a closure for the chest body, and a resilient metallic sealing strip carried by said closure and adapted for sealing engagement with the body, said strip having an amplitude of movement such as to adapt it to compensate for possible variations between the opposing surfaces of the chest and closure due to warping of the latter.

4. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with packing means therein insoluble in cedar oil, a closure for the receptacle, and means for sealing the joint between the body and closure when said closure is closed.

5. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with packing means therein insoluble in cedar oil, a closure for the receptacle, and a resilient metal sealing strip carried by the closure for sealing the joint between the closure and body when said closure is closed.

6. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with packing means therein insoluble in cedar oil, a closure for the receptacle, and a sealing strip secured at one edge to the closure and having a free edge portion arranged at an angle greater than a right angle at its secured edge for contact with the body, said free edge portion having an amplitude of flexibility sufficiently great to compensate for any normal spacing variations between the body and closure in the closed position of the closure due to warping of the latter.

7. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with packing means therein insoluble in cedar oil, a closure for the receptacle, angularly related resilient metal sealing strips along the contact margins of the closure adapted for engagement with the edges of the walls of the body, and means connecting and sealing the joints between the ends of said strips.

8. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with packing means therein insoluble in cedar oil, a closure for the receptacle, sealing strips each having an edge portion secured to the closure and an edge portion for contact with the body to seal the joint between the closure and body when the closure is closed, said contact edge portions of the strips being disposed at greater than a right angle to the secured edge portions thereof, and a plastic sealing means in the joint between the contact edges of the strips and the overlying portions of the closure.

9. In a cedar chest, walls having corner portions provided with joints, having outer bevelled faces and inner faces arranged at right angles to each other, said inner faces being provided with tongue and groove connections, and a sealing gasket disposed between said faces.

10. A cedar chest comprising a body, a closure for the body, a resilient metallic sealing strip secured at one edge to the closure and having its opposite edge bent at an angle thereto and adapted for sealing engagement with the edges of the body, a lock for securing the closure in closed condition and to hold the sealing strip under stress, and a body of plastic material arranged to close the joint between the secured portion of the strip and the closure so as to seal such joint against leakage.

11. A cedar chest comprising a body, a closure for the body, a gasket secured to the underside of the closure and adapted to partially rest upon the edges of the body when the closure is in closed condition, a lock for holding the closure in closed condition, a resilient sealing strip secured at one edge to the closure and having a free edge bent at an angle thereto for engagement with the marginal edges of the body beyond the gasket to seal the joint at this point, and plastic sealing means closing the joint between the sealing strip and the surface of the closure to which said strip is secured.

12. A cedar chest having a body formed of front, rear and side walls, said walls having tortuous joints at their connecting portions, plastic sealing means in said joints sealing the same against the escape of aromatic oil or vapor from the chest, a veneer outer facing for the walls of a wood material having a high degree of resistance to the passage of cedar aroma therethrough, a cementitious material securing the material to the walls, and an outer finishing coating on the veneer, the said cementitious and finishing materials being insoluble in cedar oil and acting to seal the facing against the passage of cedar oil vapor.

13. A cedar chest comprising a body formed of walls of cedar oil bearing material, said walls having tortuous joints between their opposed faces at the corners thereof, a plastic filling in said joints and sealing the same against the escape of cedar oil aroma, sealing means secured to the outer surfaces of said walls and sealing the same against the escape of cedar oil aroma, a closure for the body, and sealing means for closing the joint against the escape of cedar oil aroma when the closure is closed, said sealing means on the body and closure being proof against the action of cedar oil.

14. A cedar chest comprising a body with bottom and four walls and a closure hinged thereto, a resilient metal sealing strip secured to the inner face of said closure along its edges and adapted to close the joints between the same and body walls when said closure is closed, adjacent ends of the said strips meeting at an angle at the corners of the body, and sealing members connecting and sealing the joints at the meeting ends of said sealing strips.

15. A cedar chest comprising a body portion and a closure hinged thereto, a resilient metal sealing strip secured at one edge to the underface of said closure at its four edges, the adjacent ends of said strips terminating in return bends, and caps having bent edges embracing and interlocking with the return bends on the said strips and sealing the joints between the adjacent ends of the said strips.

16. A cedar chest comprising a body and a closure hinged thereto, said closure having a groove in its underface, and a resilient metal sealing strip extending along said face and having one of its longitudinal edges bent to form an upwardly extending flange secured in said groove and having its opposite longitudinal edge deflected away from said face of the closure at an angle greater than a right angle with relation to said flange for yielding engagement with the edge of the body to form a seal between the said body and closure, and a layer of sealing material between said strip and face of the closure.

17. A cedar chest comprising a body portion and a closure, hinges connecting said body and closure, one leaf of each hinge being counter sunk in and flush with the underface of the closure, the other leaf of each hinge being secured to the outer face of the back wall of said body, resilient metal sealing strips secured at one edge to the underface of the closure along its four edges, one of which strips overlies the counter sunk hinge leaf, the free edges of said strips being arranged to engage the edges of the body and to close the joints between the body and closure, connections coupling and sealing the joints between the ends of the strips, a lock latch secured to the underface of the closure, a lock secured to the body, and a sealing medium secured to the underface of the closure designed to seal the joint between the latch and lock.

18. A clothes receptacle of the character described comprising a closure hinged to said body, a veneer of a material highly resistant against leakage of cedar oil therethrough secured to the outer faces of said bottom, walls and closure, resilient metal sealing strips along the underface of said closure near the edges thereof for sealing engagement with the edges of the body walls, and joint connections between the meeting ends of the said strips reinforcing said ends of the strips and sealing the joints therebetween.

19. A clothes holding receptacle adapted to prevent moth depredations comprising a body having its walls provided with cedar oil bearing material, an external sheathing to prevent escape of cedar aroma therethrough from said material, said walls having joints extending on irregular lines and provided with sealing means therein insoluble in cedar oil, a closure for the receptacle, resilient means for sealing the joint between the body and closure when said closure is closed, and means for securing the closure in closed position and holding the sealing means under tension when the closure is closed.

20. A clothes holding receptacle adapted to prevent moth depredations comprising a body having walls provided with cedar oil bearing material, an external sheathing on at least a part of said walls to prevent the escape of cedar aroma outwardly from said material, said walls being joined to each other and the contacting surfaces of the joints being provided with sealing means insoluble in cedar oil, a closure for the receptacle, resilient means for sealing the joint between the body and closure when the latter is in closed position, and means for securing the closure in closed position and holding the sealing means under tension.

LAWRENCE K. LOFTIN.